United States Patent [19]

Gusi

[11] Patent Number: 5,773,494

[45] Date of Patent: Jun. 30, 1998

[54] LASER-MARKABLE ARTICLE AND A COMPOSITION CONTAINING A UREA THERMOSETTING RESIN FOR MAKING THE SAME

[75] Inventor: Piero Camillo Gusi, Marostica, Italy

[73] Assignee: Finvimar International B.V., Amsterdam, Netherlands

[21] Appl. No.: 713,390

[22] Filed: Sep. 13, 1996

[51] Int. Cl.[6] .................................................. C08L 1/02
[52] U.S. Cl. .............................. 524/14; 523/136; 524/13; 524/35
[58] Field of Search ............................... 524/13, 14, 497, 524/15, 16, 35; 523/136, 137

[56] References Cited

U.S. PATENT DOCUMENTS

| | | | |
|---|---|---|---|
| 1,482,357 | 1/1924 | Ellis | 524/13 |
| 1,756,252 | 4/1930 | Lougovoy | 524/14 |
| 1,905,999 | 4/1933 | Ellis | 524/14 |
| 2,038,345 | 4/1936 | Cochrane | 524/14 |
| 2,075,805 | 4/1937 | Ellis | 524/35 |
| 2,092,502 | 9/1937 | Ellis | 524/14 |
| 2,260,033 | 10/1941 | Kienle et al. | 524/35 |
| 2,317,181 | 4/1943 | D'Alelio | 524/14 |
| 2,333,396 | 11/1943 | Stock | 524/14 |
| 3,336,248 | 8/1967 | Sincavage et al. | 524/14 |
| 3,909,470 | 9/1975 | Lambuth et al. | 524/35 |
| 5,422,383 | 6/1995 | Takahashi et al. | 523/136 |
| 5,432,213 | 7/1995 | Kim et al. | 524/13 |
| 5,434,200 | 7/1995 | Kolker et al. | 524/13 |

FOREIGN PATENT DOCUMENTS

| | | | |
|---|---|---|---|
| 0 190 997 | 8/1986 | European Pat. Off. . | |
| 912904 | 12/1962 | United Kingdom | 524/35 |

OTHER PUBLICATIONS

Derwent Publications, Ltd. London, GB, AN 95–101580 and abstract of JP-A-07-025,154.

Derwent Publications, Ltd., London, GB, AN 95–127963 and abstract of JP-A-07-052,536.

*Primary Examiner*—Peter A. Szekely
*Attorney, Agent, or Firm*—Cushman Darby & Cushman, IP Group of Pillsbury Madison & Sutro, LLP

[57] ABSTRACT

A laser beam absorbing resin composition adaptable for laser marking, and a markable article formulated from such resin composition is provided. The composition includes at least a urea-based thermosetting resin, a cellulose reinforcement, and titanium dioxide. The titanium dioxide is preferably present in a concentration of at least about 1.5 wt % of the composition, more preferably in a range of at least about 1.5 wt % to at most about 5 wt % of the composition, and most preferably in a range of at least about 2 wt % to at most about 5 wt % of the composition.

5 Claims, 1 Drawing Sheet

LASER-MARKABLE ARTICLE AND A COMPOSITION CONTAINING A UREA THERMOSETTING RESIN FOR MAKING THE SAME

BACKGROUND OF THE INVENTION

1. Field of Invention

The present invention generally relates to a urea-based thermosetting resin composition containing cellulose and a specified amount of titanium dioxide, which composition is particularly suitable for formulating an article adaptable for marking with a laser beam. The present invention is also directed to laser-markable articles, such as, by way of example, electronic components, cover plates, and the like.

2. Description of Related Art

Various methods have been known for imparting writings, logos, trademarks, identification symbols, and other forms of communication on the surface of molded plastic articles. For example, one conventional technique involves directly engraving a desired marking into a molding die or molding die part. Practice of this technique, however, requires the provision of various interchangeable dies or die parts (e.g., punches, inserts, etc.) in order to change the engraved marking that is transcribed to the molded article. The provision of separate dies or die parts for each desired marking can prove quite expensive. Further, alternating between different markings requires interchanging of the dies or die parts, which can cause unacceptable production down times and increase production costs.

A second conventional technique employed for marking a plastic article is often referred to as a hot stamping process, which involves the transferring of films to the article surface, the transference being accompanied by simultaneous application of high pressure and heat. Practice of this particular technique is hampered by the long cycle times and high production costs required to obtain an aesthetically satisfactory marking.

Silk-screen printing and pad printing, which involve transferring inks onto the surface of a product, are alternative conventional techniques employed for marking molded articles. Practice of these techniques is often associated with scratch, abrasion, and friction resistance problems. Another difficulty associated with these techniques involves the inability to effect permanent transference of the inks to plastic materials. Incompatibility between the inks and the molding material or solvents employed in producing the molding material can impair the friction resistance of the markings, resulting in smearing of the markings.

The problems associated with the above-mentioned techniques have been overcome to some degree by employing laser technology to impart markings to a molded article. According to this technology, a laser beam, preferably guided by an electronic system preprogrammed with a predetermined pattern, is irradiated on portions of the surface of an article formed from laser markable material along the pattern. The irradiated surface portions are colored (or discolored) to form a chromatic appearance different from the portions that are not irradiated. Consequently, a discriminative pattern is imparted on the surface of the molded article.

The laser marking technique compares favorably with the other above-mentioned techniques for marking a molded article. Specifically, the laser marking technique produces markings with clear, high contrast patterns relative to these other techniques, which can significantly improve the legibility and discernability of the markings inscribed on the molded article. Further, a marking produced by irradiation with a laser beam is much more indelible and consistent in quality than markings prepared by the other techniques. The laser technology also does not require the provision of undesirable additives and solvents, such as dyes, inks, and films. Finally, the laser technology is clearly advantageous from an economic standpoint and in production times.

Previously adopted laser irradiation techniques have employed certain thermoplastic resins as their primary constituent. Thermoplastic resins typically contain very large portions of laser-reactive materials, which are added to the thermoplastic materials in such large portions in order to impart a satisfactory opaqueness to the non-irradiated surface portions of the molded article.

On the other hand, light-colored thermosetting resins usually are dismissed from consideration as appropriate materials for laser marking applications. This is because thermosetting resins are generally associated with and known for providing extremely poor contrast between laser-irradiated, discolored surface portions of the marked article and the non-irradiated portions, even when extended laser beam application times and high powered laser beams are employed.

SUMMARY OF THE INVENTION

An object of the present invention, therefore, is to solve the aforementioned problems associated with the prior art as well as other problems by providing a laser beam absorbing resin composition which can give a high contrast pattern upon being subjected to irradiation with a laser beam.

Another object of the present invention is to provide a laser markable article formulated from a resin composition that is suitable for imparting highly discernible and indelible markings thereto.

These and other objects are accomplished, in accordance with one aspect of the present invention, by providing a laser beam absorbing resin composition which is adaptable for laser marking and which includes at least a urea thermosetting resin, a cellulose-based reinforcement material, and titanium dioxide. The titanium dioxide is preferably present in a concentration of at least about 1.5 wt % of the composition, more preferably in a range of at least about 1.5 wt % to at most about 5 wt % of the composition, and most preferably in a range of at least about 2 wt % to at most about 5 wt % of the composition.

The present invention is also directed to a markable object produced from the aforementioned composition, as well as a process for preparing the markable object.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings.

DESCRIPTION OF THE PREFERRED EMBODIMENTS

Figure 1:
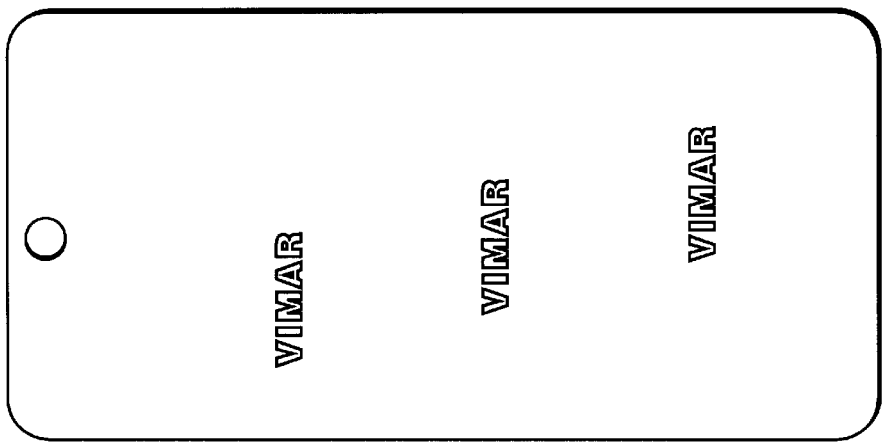
FIG. 1 is a plan view of a laser marked article formulated from a urea-based thermosetting resin composition containing 0.8% by weight of titanium dioxide.

A detailed description of the present invention is provided below.

A laser beam absorbing resin composition may be provided which includes at least a urea thermosetting resin, a cellulose-based reinforcement material, and a material that changes color upon being subjected to a laser beam (hereinafter referred to as a color changeable material).

The titanium dioxide is preferably selected as the color changeable material, and preferably is present in a concentration of at least about 1.5 wt % of the composition, more preferably in a range of at least about 1.5 wt % to at most about 5 wt % of the composition, and most preferably in a range of at least about 2 wt % to at most about 5 wt % of the composition. The titanium dioxide generally has an average particle diameter of about 0.01 μm to about 10 μm.

Titanium dioxide undergoes discoloration upon being irradiated with a suitable laser beam, insofar as it undergoes a phenomenon in which the surface portion of the composition irradiated with a laser beam becomes visually discriminative from non-irradiated surfaces. Unlike an article formed from a thermoplastic resin, which requires a large amount of colorant in order to obtain adequate opaqueness, an article containing urea as an essential constituent has non-irradiated surface portions which usually exhibit a light color, such as white, ivory, light grey, light grown, etc.

The laser beam absorbing composition preferably contains a weight ratio of urea thermosetting resin to cellulose in a range of about at least 68:32 to at most 70:30, and more preferably about 70:30.

In preparing the molded article of the present invention, various known methods can be employed, including, but not limited to, transfer molding, injection molding, and compression molding. The urea resin preferably is supplied in the form of a powder, pellets, or other mass, but can take on other forms, such as a liquid. During molding, the urea based resin is polymerized under standard molding conditions, such as, by way of example, under an initial pressure of about 150 kg/cm$^2$ and initial temperature range of about 140° C. to about 160° C. These parameters can be varied during molding. Cellulose preferably is added to the urea-based resin at the beginning or early stage of polymerization, whereas the titanium dioxide preferably is added after polymerization as partially proceeded.

The resin composition can be molded into a shaped article, including, by way of example, a plate, a film, a pipe, a block, a coating, or the like or a composite article. Coatings, casings or packages for electric or electronic parts, such as condensers, resistors, diodes, and integrated circuits (ICs), are typical examples of molded articles which can suitably be prepared by the illustrated embodiment. The coating may be applied onto any desired surface, such as, for example, a metal, ceramic, plastic, paper, or wood material.

In addition, various additives can be incorporated into the laser beam absorbing resin composition as desired. Exemplary additives include an auxiliary colorant, an inorganic or organic filler, a thixotropic agent, a flame retardant, a coupling agent, a leveling agent, a rubber, a curing agent, a curing accelerator, a polymerization initiator, a polymerization catalyst, or any combination thereof. Illustrative additives are disclosed in U.S. Pat. No. 5,422,383, the complete disclosure of which is incorporated herein by reference.

A laser beam is employed to make desired marks or patterns having a color clearly discriminative from the background (i.e., the non-irradiated surface portions of the molded article) on the surface of the molded article prepared by the laser beam absorbing resin composition of the present invention. An example of a marking laser beam and an apparatus for generating the same also are disclosed in U.S. Pat. No. 5,422,383.

Figure 2:
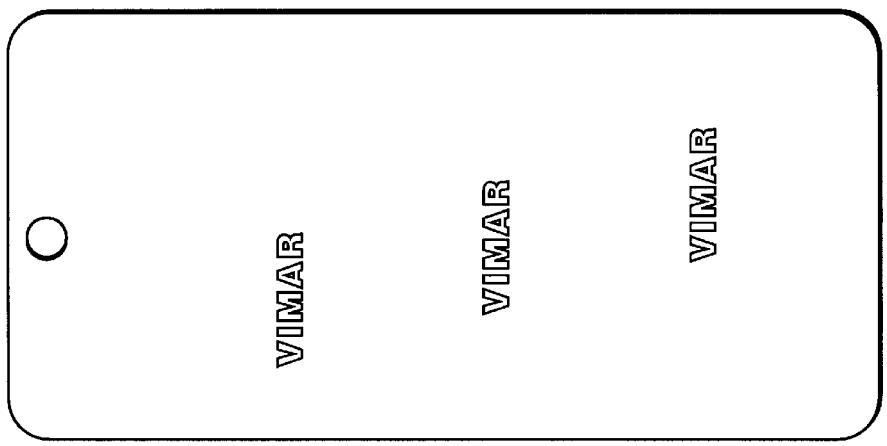
FIG. 2 is a plan view of a laser marked article formulated from a urea-based thermosetting resin composition containing 3% by weight of titanium dioxide, in accordance with an embodiment of the present invention.
Figure 3:
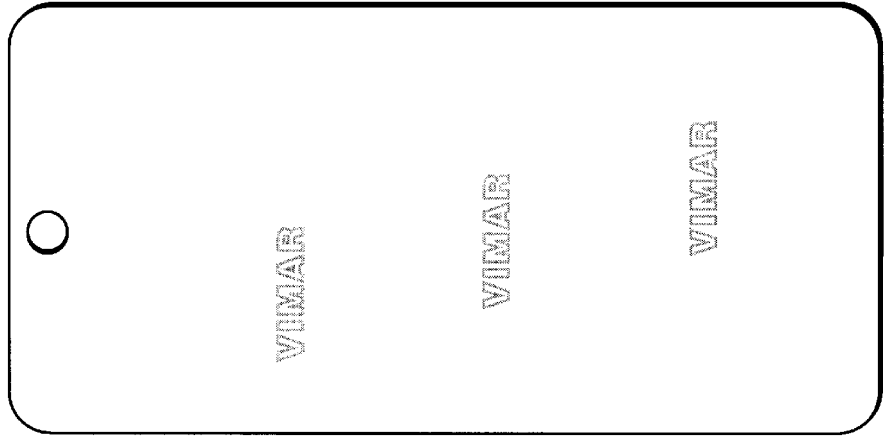
FIG. 3 is a plan view of a laser marked article formulated from a urea-based thermosetting resin composition containing 4% by weight of titanium dioxide, in accordance with another embodiment of the present invention.

As illustrated in FIG. 1, an article formulated from a composition containing less than about 1 wt % titanium oxide exhibits an inferior contrast between the markings and the background. On the other hand, articles formulated from a composition containing at least 1 wt % titanium oxide, as illustrated in FIGS. 2 and 3, can be marked to provide a superior contrast. The provision of greater than about 5 wt % titanium oxide in the composition is not accompanied by any improvement in laser marking, and is economically undesirable.

A thermosetting resin composition and an article produced from the same are disclosed in Italian Patent Application No. MI95A 000490, filed on Mar. 14, 1995, the complete disclosure of which is incorporated herein by reference.

Although the present invention has been described in detail with reference to its presently preferred embodiments, it will be understood by those of ordinary skill in the art that various modifications and improvements to the present invention are believed to be apparent to one skilled in the art. All such modifications and improvements are intended to be included within the scope of the following appended claims.

What is claimed is:

1. A laser markable article formulated from a composition comprising:

a urea thermosetting resin;

cellulose; and titanium dioxide, said titanium dioxide being present in a concentration of at least about 1.5% of said composition, wherein at least one surface of said article has a laser-radiated, discolored portion that is visually distinguishable relative to surrounding portions.

2. A laser markable article according to claim 1, wherein said concentration of titanium dioxide is not greater than about 5 wt % of said composition.

3. A laser markable article according to claim 2, wherein said concentration of titanium dioxide is not less than about 2 wt % of said composition.

4. A laser markable article according to claim 3, wherein a weight ratio of urea thermosetting resin to cellulose is about 70:30.

5. A laser markable article according to claim 2, wherein irradiation of a portion of a surface formed on said article results in a discoloration of said portion of said surface, which discoloration serves to visually distinguish said portion from a remaining, non-radiated portion of said surface.

* * * * *